April 3, 1962   V. P. HEAD   3,027,756
SOLIDS CONCENTRATION MEASURING AND REGULATING DEVICE
Filed Feb. 5, 1958   4 Sheets-Sheet 1
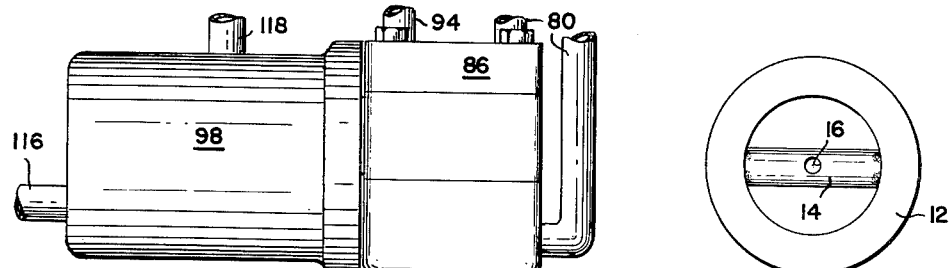
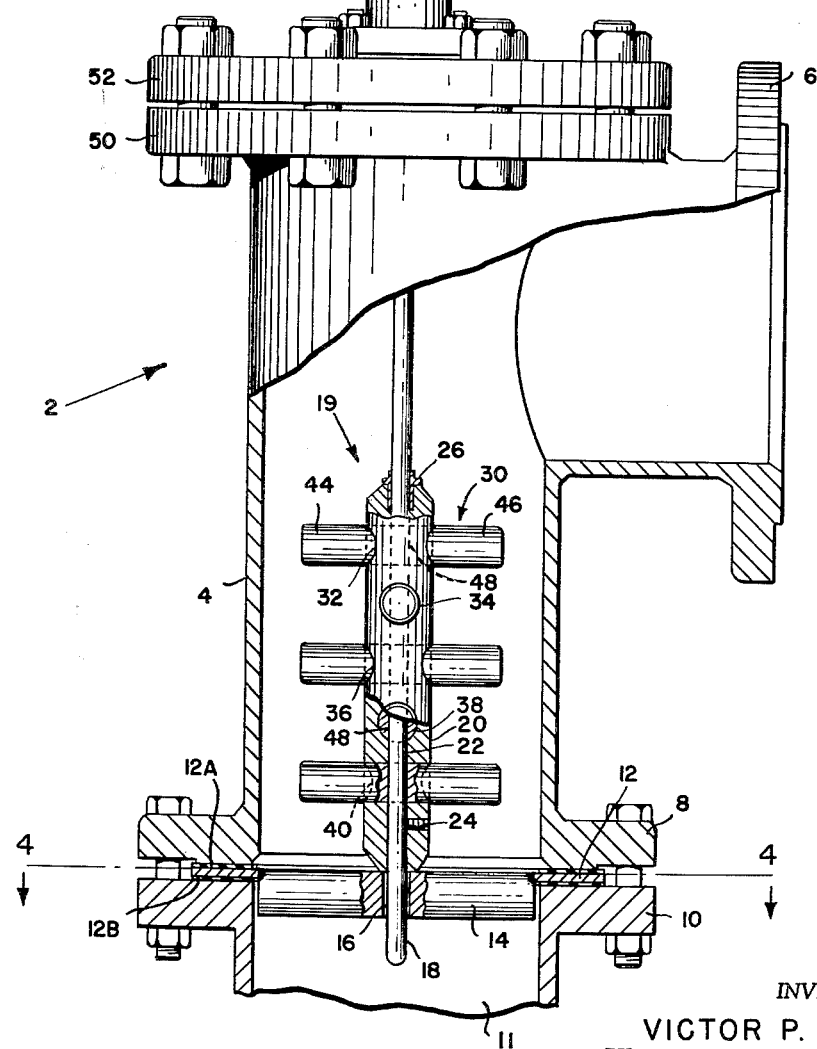
FIG. 4.
FIG. 1.
INVENTOR.
VICTOR P. HEAD
BY
ATTORNEYS April 3, 1962  V. P. HEAD  3,027,756
SOLIDS CONCENTRATION MEASURING AND REGULATING DEVICE
Filed Feb. 5, 1958  4 Sheets-Sheet 2

INVENTOR.
VICTOR P. HEAD
BY
ATTORNEYS

April 3, 1962 V. P. HEAD 3,027,756
SOLIDS CONCENTRATION MEASURING AND REGULATING DEVICE
Filed Feb. 5, 1958 4 Sheets-Sheet 4

INVENTOR.
VICTOR P. HEAD
BY
ATTORNEYS

United States Patent Office 3,027,756
Patented Apr. 3, 1962

3,027,756
SOLIDS CONCENTRATION MEASURING AND REGULATING DEVICE
Victor P. Head, Hatboro, Pa., assignor to Fischer & Porter Company, Hatboro, Pa., a corporation of Pennsylvania
Filed Feb. 5, 1958, Ser. No. 713,406
6 Claims. (Cl. 73—53)

This invention relates to a solids concentration measuring and regulating device which is particularly useful for regulating the solids concentration of substantially non-viscous plastics, for example, solids suspended in a non-viscous liquid such as an aqueous medium, i.e., fibrous slurries such as a paper stock of wood fibers, food products such as applesauce or ketchup, cement slurries, ore slurries or raw cornstarch suspensions.

The heretofore known devices for determining and controlling the solids concentration of a non-viscous plastic all have relatively serious limitations. Some of these devices depend upon a measurement of pipe friction which is unsatisfactory since it varies substantially with changes in the rate of flow. Rather complex devices have been developed to overcome this serious limitation. Such devices rely on the withdrawal of a sample from the main conduit and measure pipe friction at a standard rate of flow through a standard pipe. Such devices are not only relatively complex but also are unsatisfactory since the sample, which necessarily comes from a point adjacent the inner periphery of the conduit, will not be representative of the stock as a whole due to the variations in solids concentration of stock which occur from the center of the conduit to its inner periphery.

The pipe friction devices are further unsatisfactory since even where the rate of flow is constant, they are still dependent upon variations in freeness, that is, the measure of ease with which water separates from the fibers, which measure determines the thickness of the separated liquid film layer adjacent the inner periphery of the conduit.

There have also been employed devices to measure solids concentration by measuring the torque of motor driven paddles. Where the paddles are disposed in the main conduit, such devices are unsatisfactory due to the substantial effect of the flow rate on the paddles unless very low velocities requiring very large costly devices are employed. Where this type of mechanism is employed on a sample withdrawn from the main conduit, it is open to the objections discussed above, namely, that the sample is not truly representative of the stock passing through the conduit and it is subject to error due to the separated liquid film at the large paddle surfaces.

All of the above discussed problems have been solved by this invention by providing a device which measures the stress in shear of substantially non-viscous plastics. The yield stress value in shear of such plastics, for example, a fibrous slurry such as paper stock, varies directly with the percent by weight of solids in such plastics. In such plastics rate of shear makes only a very slight variation in shear stress. Hence, substantial flow variations do not materially affect the accuracy of the device so far as shear stress is concerned.

The device of this invention comprises a hollow casing providing a flow path for the plastics and having one or more obstructions extending into the path of flow and producing distortion of the flowing non-viscous plastic. The shear stress of the plastic is measured by either measuring the force exerted on the obstructions or measuring the pressure drop through the device incident to distortion of the plastic.

Advantageously the obstructions are designed to provide a minimum of accelerative or inertial disturbance. For example, where less than 30% of any cross-sectional area of the flow path in the device is occupied by an obstruction and where the velocity of flow is from ½ ft./sec. to 5 ft./sec., the device has a negligible flow sensitivity. It is also desirable to employ a repeated number of relatively small obstructions to achieve the desired distortion of the fluid to eliminate the effect of mere sliding friction.

The obstructions have a curved periphery preferably circular in cross-section and extend into the path of flow of the plastic. Where placed on a moving structure, it is preferred to have opposed obstructions to balance the forces exerted on the device. Advantageously, obstructions will be spaced in the device along the line of flow preferably with the next adjacent obstructions along the line of flow being at an angle with respect to each other, for example, 90° apart. Preferably the obstructions will have a minimum width of ½" presented to the path of flow and a minimum projection length of ½".

The device in accordance with this invention is markedly advantageous over the prior art in that it provides a measure of solids concentration when utilized directly in the main flow line without being materially effected by substantial changes in flow rate.

The results achieved by this invention are particularly surprising in the light of the fact that the viscosity of a viscous fluid can be measured with a drag body only if it is immersed in a tube of one particular size and calibrated at one particular flow rate.

The device of this invention has the further advantage in that it is capable of providing a consistency measurement which is representative of the total flow of the non-viscous plastic as distinguished from a mere sample without any enlargement of the main line of flow.

The invention will be further clarified by reference to the following description in conjunction with the drawings in which:

FIGURE 1 is a solids concentration measuring device in accordance with this invention;

FIGURE 4 is a section taken on the plane indicated by the line 4—4 in FIGURE 1;

Figure 2:
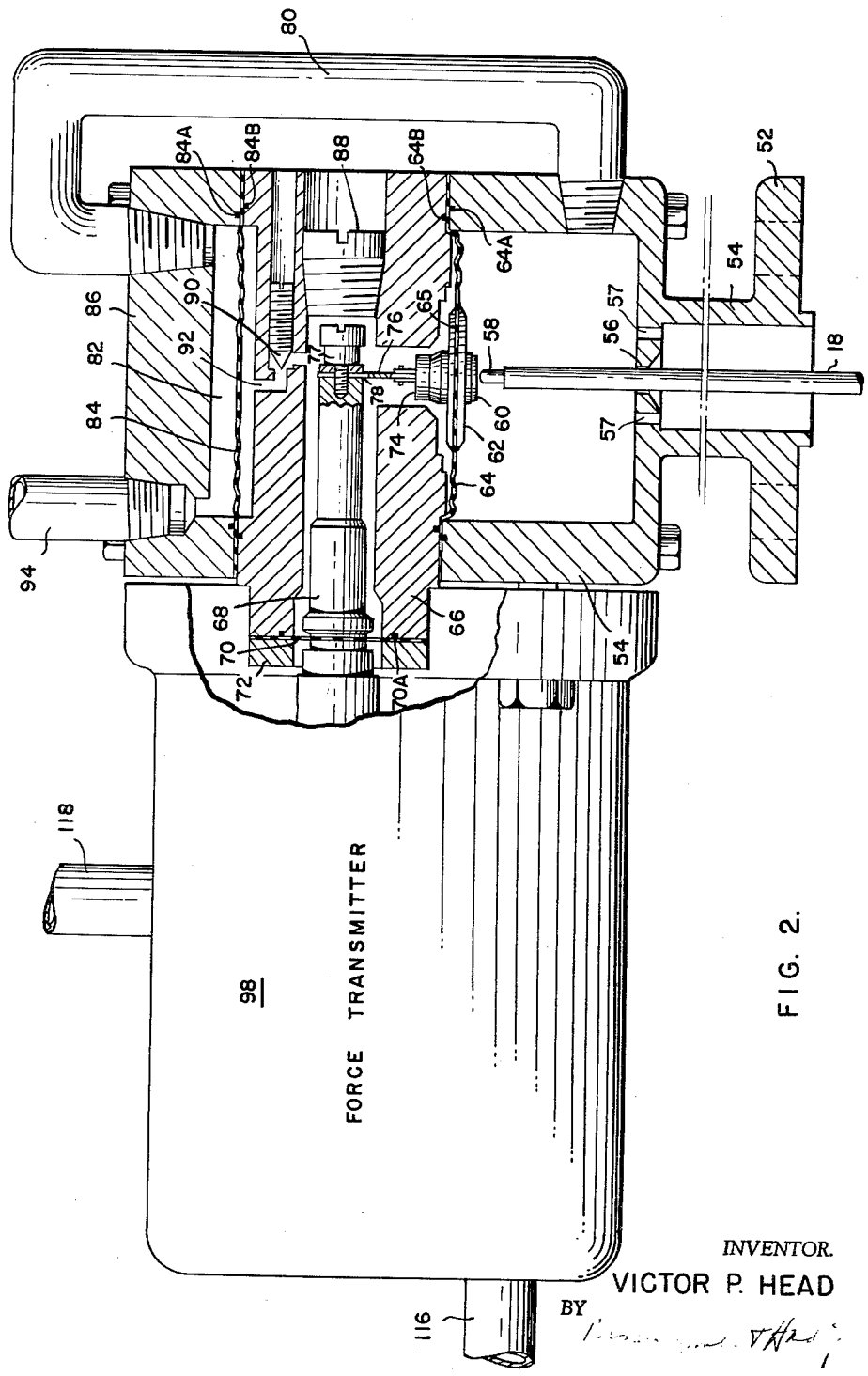
FIGURE 2 is a vertical section of the upper portion of the device of FIGURE 1.

As shown in FIGURE 1, a solids concentration measuring device 2 in accordance with this invention has a T-shaped casing 4 which is in the form of a pipe T which is provided with a pair of flanges 6 and 8, flange 6 being adapted to be bolted to a discharge line and flange 8 being bolted to a flange 10 of a supply line 11.

Clamped between flanges 8 and 10 is a metal ring 12, gaskets 12A and 12B. A rod 14 is welded to ring 12 and is provided with a bore 16. Bore 16 acts as a guide for stem 18 of drag body 19.

Drag body 19 has a sleeve 20 having a bore 22 and mounted on stem 18. A set screw 24 and a bushing member 26 welded to stem 18 hold sleeve 20 in position. Prior to being mounted on stem 18, sleeve 20 is provided with rods 30 which are inserted in bores 32, 34, 36, 38 and 40 in sleeve 20, adjacent bores having their axes 90° apart. As thus positioned, each rod 30 provides opposed projections 44 and 46 extending outwardly beyond sleeve 20. Each rod 30 has a bore 48 for the reception of stem 18.

Drag body 19 can be made of any suitable material such as a metal or a synthetic resin. It is preferred to have stem 18 of metal and sleeve 20 and rod 30 of a synthetic resin in order to keep the weight of the drag body relatively low.

Casing 4 is also provided with a flange 50 which is bolted to flange 52 which, in turn, is flanged to casing 54. As shown in FIGURE 2, stem 18 extends upwardly into casing 54 which has a restricted neck 56 which acts to guide stem 18. Openings 57 eliminate any pressure drop through neck 56. Stem 18 is provided with a rounded head 58 which is adapted to engage a disc 60 secured to diaphragm plate 62. A diaphragm 64 passes between plate 62 and an opposed plate 65, diaphragm 64 being secured between casing 54 and hollow body 66, a seal being effected by O rings 64A and 64B.

Body 66 contains a lever 68 which is pivotally mounted on a diaphragm 70 secured between body 66 and ring 72, a seal being effected by O ring 70A. Lever 68, in turn, is rigidly connected by a link 76 to disc 74 mounted on diaphragm plate 65. Bolt 77 passes through slot 78 in link 76 to adjustably secure link 76 to lever 68.

Diaphragm 64 is balanced with respect to the water pressure in casing 54 by means of a hydraulic balancing system. A hydraulic line 80 connects the interior of casing 54 with chamber 82 formed by diaphragm 84 which is retained in position by body 66 and by cap 86 with a seal being effected by O rings 84A and 84B. Within body 66 there is contained a hydraulic fluid, preferably an oil, which will be non-corrosive to the parts within body 66. The oil can be introduced into body 66 by means of a plug 88. A needle valve 90 in restricted passage 92 acts to provide for an adjustable dampening of the hydraulic fluid within body 66. Chamber 82 is connected to a purging water line 94.

Lever 68 is connected to a force transmitter indicated at 98. The force transmitter 98 can be any conventional transducer suitable for converting the force exerted by lever 68 to, for example, a pneumatic or electrical output for transmission to a recorder and/or a controller.

Figure 3:
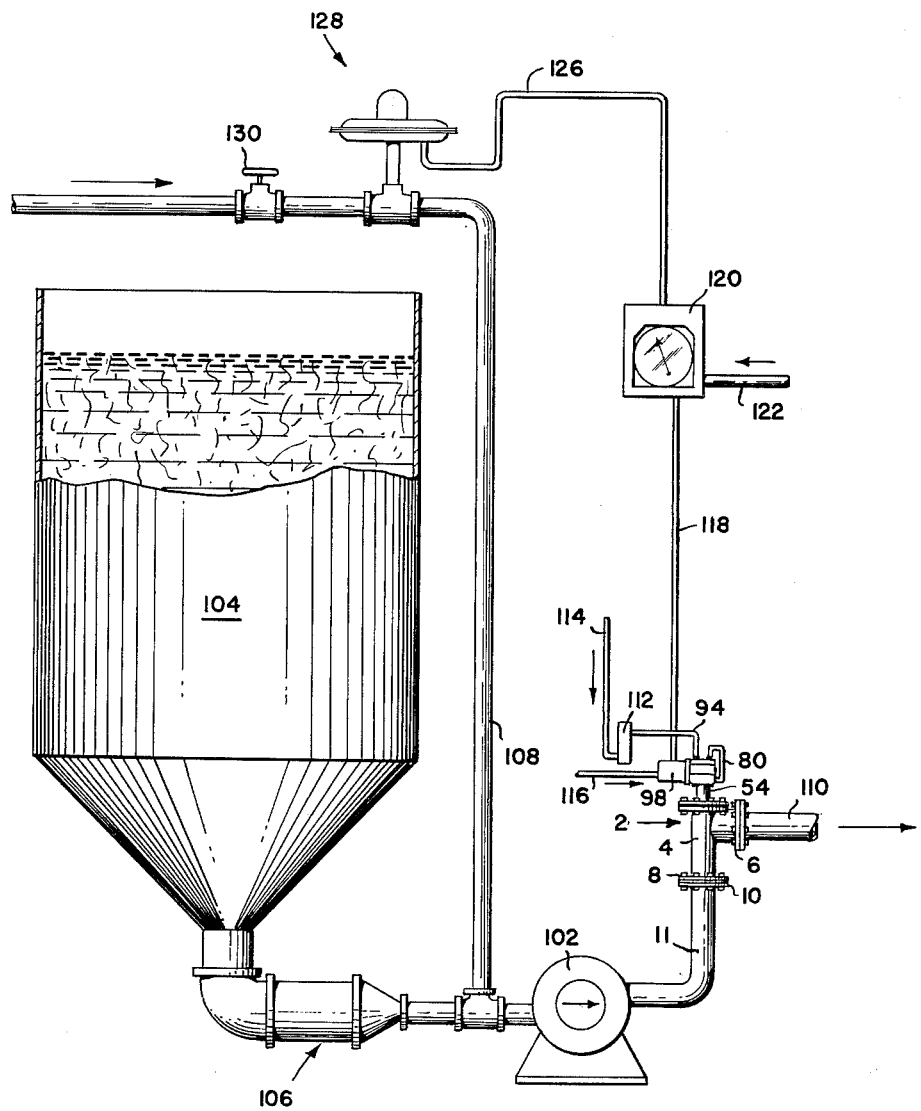
FIGURE 3 is a schematic showing of a solids concentration regulating device in accordance with this invention and employing the solids concentration measuring device of FIGURE 1.

Referring now to FIGURE 3, the solids concentration measurer 2 is shown connected to supply line 11 which is connected to the output side of a pump 102. Pump 102 has its input side connected to a paper stock chest 104 by a pipe system indicated at 106. A water line 108 is also connected to pipe system 106 adjacent the input side of pump 102. Solids concentration measurer 2 is also connected to discharge line 110.

Purge line 94 is connected to a meter 112 which is supplied by a water line 114, meter 112 providing a controlled rate of flow into purge line 94, it being desirable to have a relatively low rate of flow through purge line 94, for example, from 0.25 to 1 g.p.m. The pressure in water line 114 will be in excess of the pressure in solids concentration measurer 2, advantageously about five p.s.i. or more than the pressure in the solids concentration measurer. The flow provided in chamber 82 (FIGURE 2), pipe 80 and within casing 54 by purge line 94 prevents plugging by the fibrous material in the slurry.

As shown in FIGURE 3, force transmitter 98 is, by way of example, a pneumatic force transmitter which is supplied with air by line 116. The air pressure output of pneumatic force transmitter 98 is carried by line 118 to a recorder-controller shown at 120 which is connected to an air supply line 122. The output of pneumatic recorder-controller 120 is carried by line 126 to a pressure controlled valve 128 in water line 108. A hand operated shut off valve 130 is placed in line 108 upstream of valve 128 in order to provide a shut off for repair work.

*Operation*

The recorder-controller having been adjusted to give a desired output solids concentration, it will maintain the desired solids concentration by virtue of controlling the amount of diluting water supplied to line 106 by line 108.

As the fibrous slurry from stock chest 104 passes through pipe system 106, it is diluted by water from line 108 and passes to pump 102 whose output is delivered to solids concentration measuring device 2 from which it is discharged into line 110. As the fibrous slurry encounters projections 44 and 46 on rods 30, it is sheared, the resultant force acting to move drag body 19 upwardly so that stem 18 exerts a force on lever 68 through pressure balanced diaphragm 64 and link 76, lever 68, in turn, transmitting the force to a force transmitter 98.

The force output of the force transmitter 98 will vary directly with the yield stress value of shear of the fibrous slurry. If the solids concentration of the fibrous slurry is too low, this will result in the transmission of a reduced force signal to the recorder-controller 120 which, in turn, will result in a change in the pressure transmitted to valve 128 to effect a further closing of valve 128 to reduce the flow of water in line 108 and hence increase the solids concentration of the fibrous slurry. In the event of the solids concentration being too high, the reverse of the above described steps will occur resulting in a further opening of valve 128 to increase the flow of water to line 106 and hence reduce the solids concentration.

*Alternative Embodiment*

Figures 5, 6:
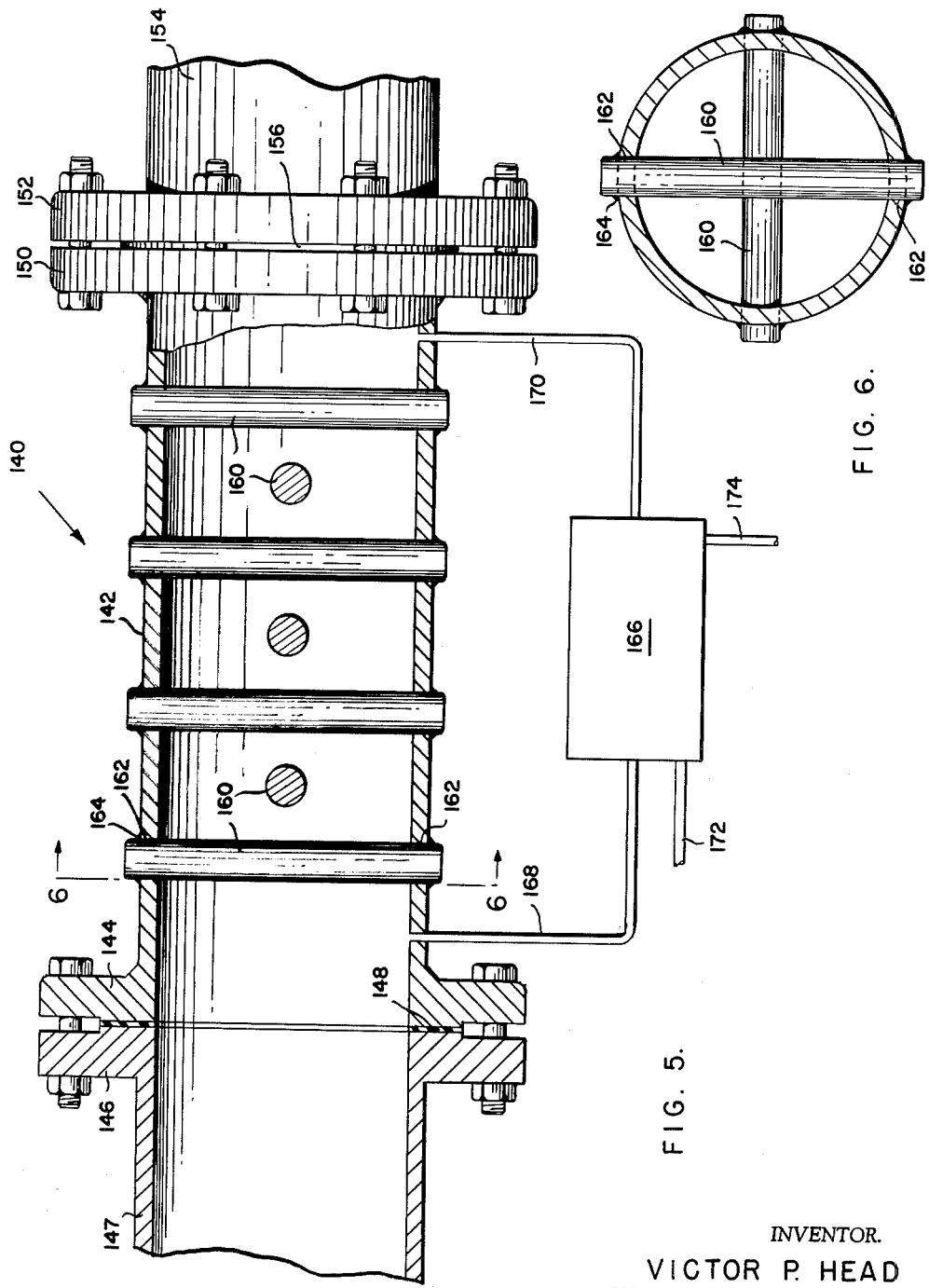
FIGURE 5 is a vertical section of an alternative solids concentration measuring device in accordance with this invention.
FIGURE 6 is a vertical section taken on the plane indicated by the line 6—6 in FIGURE 5.

An alternative embodiment of this invention is shown in FIGURES 5 and 6. Here the solids concentration measuring device 140 has a casing 142 provided with a flange 144 which can be bolted to a flange 146 of a liquid supply line 147. A gasket 148 is provided between flanges 144 and 146. At its discharge end casing 142 is provided with a flange 150 which is bolted to a flange 152 of a discharge line 154. A gasket 156 is placed between flanges 150 and 152.

A series of obstruction members 160 are passed through opposed openings 162 in casing 142 and welded to casing 142 as indicated at 164. Adjacent obstruction members 160 are positioned 90° apart from each other.

Differential pressure transmitter 166 is connected to the interior of casing 142 upstream of the obstruction members by line 168 and downstream of the obstruction members by line 170. Differential pressure transmitter 166 is of the pneumatic type and is supplied with air by line 172. The air pressure output of differential pressure transmitter 166 is carried by line 174.

*Operation of Alternative Embodiment*

A substantially non-viscous plastic, for example, a fibrous slurry is supplied to casing 142 by line 147. As the material flows through casing 142, it is sheared by obstruction members 160. The shearing results in a pressure drop in casing 142 from the point of entry of line 168 to the point of entry of line 170. The pressure differential in lines 168 and 170 will vary directly with the shear stress of the substantially non-viscous plastic passing through casing 142.

The air pressure output of differential force transmitter 166 will vary directly with the shear stress of the substantially non-viscous plastic.

It will be evident that this embodiment can readily be used for controlling the solids concentration of the fibrous slurry from stock chest 104 in FIGURE 3 if it is substituted for solids concentration measuring device 2 and force transmitter 98.

It is not desired to be limited except as set forth in the following claims.

What is claimed is:

1. A device for measuring the solids concentration of a substantially non-viscous plastic comprising a hollow casing forming a fluid passage and having an inlet opening and a discharge opening, a drag body comprising a rod mounted in said casing with its axis in the direction of a portion of the plastic flow and a plurality of cylindrical members projecting from said rod into the path of plastic flow, and means to measure the force exerted by said rod incident to the shear stress of the plastic on said body.

2. A device for measuring the solids concentration of a substantially non-viscous plastic comprising a hollow casing forming a fluid passage and having an inlet opening and a discharge opening, a drag body comprising a rod mounted in said casing with its axis in the direction of a portion of the plastic flow and a plurality of projection members spaced along the length of said rod and projecting into the path of plastic flow, and means to measure the force exerted by said rod incident to the shear stress of the plastic on said body.

3. A device for measuring the solids concentration of a substantially non-viscous plastic comprising a hollow casing forming a fluid passage and having an inlet opening and a discharge opening, a drag body comprising a rod mounted in said casing with its axis in the direction of a portion of the plastic flow and a plurality of projection members projecting from said rod and positioned angularly with respect to each other, said members projecting into the path of plastic flow, and means to measure the force exerted by said rod incident to the shear stress of the plastic on said body.

4. A device for measuring the solids concentration of a substantially non-viscous plastic comprising a hollow casing forming a fluid passage and having an inlet opening and a discharge opening, a drag body comprising a rod mounted in said casing with its axis in the direction of a portion of the plastic flow and a plurality of cylindrical projection members spaced along the length of said rod and positioned angularly with respect to each other, said members projecting from said rod into the path of plastic flow, and means to measure the force exerted by said rod incident to the shear stress of the plastic on said body.

5. A device for measuring the solids concentration of a substantially non-viscous plastic comprising a casing forming a passage for a non-viscous plastic and having an inlet opening and a discharge opening, a drag body comprising a rod having a plurality of members projecting therefrom, means mounting said rod within said casing for movement along the axis of the rod and with said axis aligned with the direction of plastic flow, a diaphragm having one side thereof subject to the pressure in said casing, means exerting a pressure on the opposite side of said diaphragm equal to said pressure in the casing, means transmitting to said diaphragm the forces exerted on said rod incident to the shearing of the plastic by the drag body, and means measuring the force transmitted to said diaphragm by the last-mentioned means.

6. A device for measuring the solids concentration of a substantially non-viscous plastic comprising a casing forming a passage for a non-viscous plastic and having an inlet opening and a discharge opening, a drag body, means mounting said drag body within said casing for movement in the direction of plastic flow, a diaphragm having one side thereof subject to the pressure in said casing, means exerting a pressure on the opposite side of said diaphragm equal to said pressure in the casing, means transmitting to said diaphragm the forces exerted on said drag body incident to the shearing of the plastic thereby, and means measuring the force transmitted to said diaphragm by the last-mentioned means.

References Cited in the file of this patent

UNITED STATES PATENTS

| | | |
|---|---|---|
| 1,225,086 | Warner | May 8, 1917 |
| 1,789,386 | Kalle | Jan. 20, 1931 |
| 1,966,638 | Morgan | July 17, 1934 |
| 2,210,027 | Cram | Aug. 6, 1940 |
| 2,339,991 | Hagy | Jan. 25, 1944 |
| 2,409,014 | Bohmer et al. | Oct. 8, 1946 |
| 2,426,393 | Fisher | Aug. 26, 1947 |
| 2,618,966 | Karlsson | Nov. 25, 1952 |